United States Patent [19]

Kondo

[11] Patent Number: 4,876,437

[45] Date of Patent: Oct. 24, 1989

[54] SOLDERING APPARATUS

[75] Inventor: Kenshi Kondo, Tokyo, Japan

[73] Assignee: Nihon Den-Netsu Keiki Co., Ltd., Tokyo, Japan

[21] Appl. No.: 218,872

[22] Filed: Jul. 14, 1988

[51] Int. Cl.[4] ................................................ B23K 3/00
[52] U.S. Cl. ..................................... 219/388; 228/20; 219/400
[58] Field of Search ...................... 228/20, 180.1, 240, 228/242, 232; 219/388, 400; 432/128, 194; 34/223

[56] References Cited

U.S. PATENT DOCUMENTS

| | | | |
|---|---|---|---|
| 1,949,716 | 3/1934 | Harsch | 34/223 X |
| 3,583,063 | 4/1970 | Growney | 228/180.1 |
| 4,321,031 | 3/1982 | Woodgate | 219/388 |
| 4,757,800 | 7/1988 | Shei et al. | 34/223 X |

Primary Examiner—Kenneth J. Ramsey
Attorney, Agent, or Firm—Stephen F. K. Yee

[57] ABSTRACT

A soldering apparatus of a type in which printed circuit boards having temporarily mounted thereon chip parts with solder paste are heated within a heating chamber to cause the solder paste to reflow. The heating chamber is partitioned into preheating chamber or chambers and a reflowing chamber, with each preheating chamber being divided into gas flow channels and center space through which the board is transferred and in which a heater, flow control plates and a fan are provided so that the hot air heated with the heater in each preheating chamber is forcibly recirculated within each chamber to preheat the board uniformly. The preheated board is transferred to the reflowing chamber provided with far infrared radiation lamps to cause the solder paste to reflow.

6 Claims, 3 Drawing Sheets

SOLDERING APPARATUS

This invention relates to an apparatus for soldering printed circuit boards and, more specifically, to a soldering apparatus of a type in which printed circuit boards having temporarily mounted thereon electric parts with solder preforms or solder pastes are heated with hot air to cause the preforms to melt or reflow.

One known soldering apparatus of the above-mentioned type is schematically shown in FIG. 4, in which designated as 1 is a printed circuit board having chip parts 2 temporarily mounted thereon with a solder paste 3. The board 1 is transferred through a housing 4 by means of a belt conveyor 5 in the direction shown by the arrow A. The inside of the housing 4 is divided by a partition plate 4a into a heating chamber 6 and a cooling chamber 7. Disposed in the heating chamber 6 are sheaths heaters 8 for heating the air therewithin. Fans 10 are provided for causing the heated air to blow on the printed circuit board 1 travelling through the heating chamber 6. Infrared radiation lamps 9 are provided in the chamber 6 adjacent to an inlet portion thereof to facilitate the heating of the printed circuit board 1. The board 1 is heated in the heating chamber 6 to a temperature sufficient to cause the solder paste 3 to melt or reflow. The resulting board 1 with molten solder is then introduced into the cooling chamber 7 where it is cooled by the action of a cooling fan 11 so that the molten solder is solidified to provide the firm bonding of the chip parts 2 to the board 1.

With the above soldering apparatus, since the stream of the heated air in the heating chamber is not uniform, the printed circuit board 1 is not uniformly heated. Therefore, when the board 1 has a large size, there is caused a soldering failure. This could be overcome if the residence time of the board 1 within the heating chamber 6 is increased by, for example, slowly transferring the board 1 through the heating chamber 6. However, the increase of the residence time tends to cause thermal damage of the chip parts 2 on the board 1.

The present invention has been made with the foregoing problems of the conventional soldering apparatus in view and provides an apparatus for soldering printed circuit boards having electric parts temporarily mounted thereon with solder preforms, comprising:

an axially elongated housing member;

conveying means providing a path along which the printed circuit boards are conveyed through said housing member in the direction parallel to the axis of said housing member;

one or more transversely extending partition means provided within said housing member for partitioning the inside space thereof into axially aligned reflowing chamber and one or more preheating chambers, with said reflowing chamber being located downstream of said one or more preheating chambers with respect to the direction of the travel of said printed circuit boards through said housing member;

an aperture provided in each of said one or more partition means to permit the printed circuit boards to pass therethrough;

a pair of spaced apart vertical partitions extending axially within each of said one or more preheating chambers for partitioning same into two, outer, air flow channels and a center space;

upper and lower openings provided in each of said vertical partitions so that the air flow channels of each chamber are in fluid communication with the corresponding center space;

first heating means disposed in the center space of each of said one or more preheating chambers for heating the air in said center space, so that the printed circuit boards are preheated with the heated air during their passage through said one or more preheating chambers;

second heating means disposed within said reflowing chamber for causing the solder preforms of the printed circuit boards to reflow during their passage through said reflowing chamber;

fan means provided in the center space of each of said one or more preheating chambers to cause the air in said chamber to circulate through said center space and said air flow channels; and flow control plates provided in the center space of each of said one or more preheating chambers and positioned between the fan and the path of travel of the printed circuit boards for controlling the flow of the circulating air through said center space so as to uniformly heat the printed circuit boards.

The present invention will now be described in detail below with reference to the accompanying drawings, in which.

Figure 1:
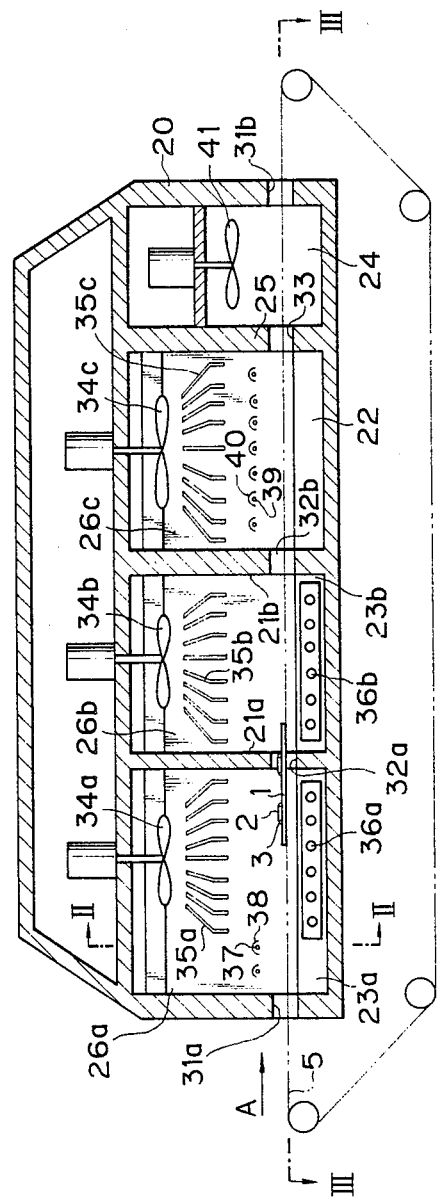
FIG. 1 is an elevational, cross-sectional view schematically showing one embodiment of a soldering apparatus according to the present invention.
Figure 2:
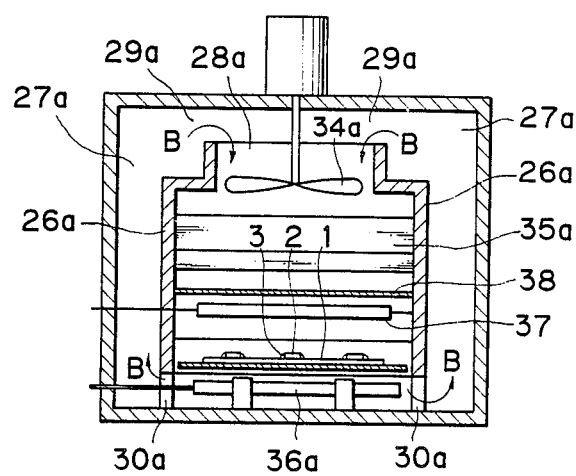
FIG. 2 is a cross-sectional view taken on the line II—II in FIG. 1.
Figure 3:
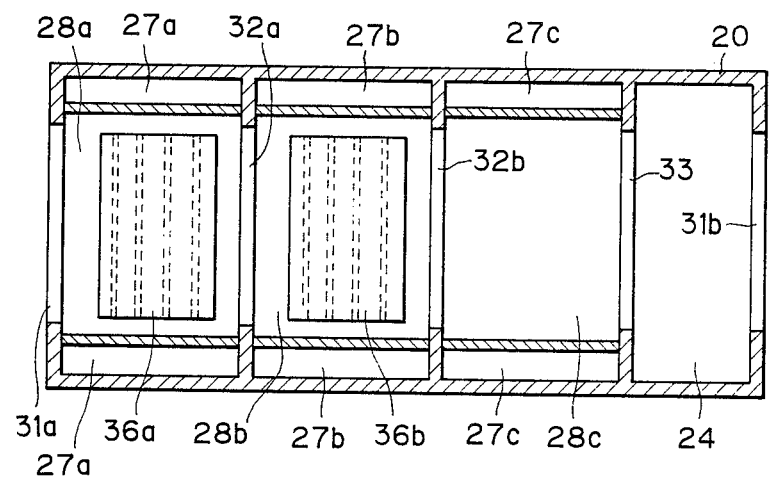
FIG. 3 is a cross-sectional view taken on the line III—III in FIG. 1.
Figure 4:
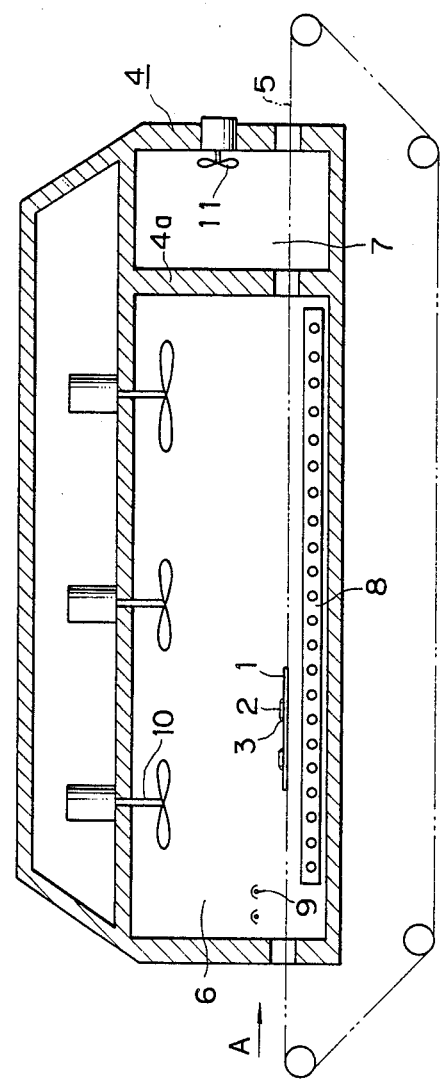
FIG. 4 is a cross-sectional view similar to FIG. 1 showing a conventional soldering apparatus.

Referring now to FIGS. 1 through 3, designated generally as 20 is an axially elongated housing member 20 generally rectangular in cross section through which a printed circuit board 1 having electric parts or chip parts 2 temporarily mounted thereon with solder preforms or pastes 3 is transferred along a predetermined path of travel, provided by conveying means such as a belt conveyor or a transfer chain 5, in the direction shown by the arrow A. The inside space of the housing member 20 is divided by one or more partition walls (two partition walls in the particular example shown) 21a and 21b into a reflowing chamber 22 and one or more (two in the particular example shown) preheating chamber 23a and 23b. The reflowing chamber 22 is positioned downstream of the preheating chambers 23a and 23b with respect to the direction of the travel of the printed circuit board 1. In the illustrated embodiment, a cooling chamber 24 is also defined downstream of the reflowing chamber 22 by a partitioning plate 25 within the housing member 20. The housing member 20, partition walls 21a and 21b and partition plate 25 are provided with suitable apertures 31a, 31b, 32a, 32b and 33 through which the printed circuit board 1 is passed during its passage through the housing member 20.

As best seen from FIG. 2, a pair of spaced apart, vertical, axially extending, partitions 26a are provided within the preheating chamber 23a for partitioning the chamber 23a into two, outer, air flow channels 27a and a center space 28a. Each partition 26a has top and bottom openings 29a and 30a so that the air flow channels 27a are in fluid communication with the center space 28a through the openings 29a and 30a. A fan 34a is provided in the center space 28a. The fan 34a is operable so that the air within the preheating chamber 23a is caused to be circulated as shown by the arrow B in FIG. 2 from the center space 28a into the air flow channels 27a through the bottom openings 30a and then into the center space 28a through the top openings 29a. Flow control plates 35a are disposed in the center space 28a of the preheating chamber 23a at a position between the fan 34a and the conveyor belt 5 for uniformly distributing the flow of the air through the center space 28a. Preferably, the flow control plates 35a are axially spaced apart, downwardly diverging plates extending laterally between and supported by the partitions 26a. The number, structure, orientation of the control plates 35a may be suitably determined so as to obtain optimum results.

The preheating chamber 23b and, preferably the reflowing chamber 22, too, are provided with partitions 26b and 26c having top and bottom openings 29b and 29c, and 30b and 30c; fans 34b and 34c; and flow control plates 35b and 35c, respectively. These parts are similar to those in the preheating chamber 23a and the detailed explanation thereof is not repeated here.

First heating means, such as electric heaters, preferably sheaths heaters 36a and 36b, are provided in the center spaces 28a and 28b, respectively, for heating the air therewithin. Thus, the printed circuit board 1 is preheated by the heated air during its passage through the preheating chambers 23a and 23b. It is preferred that an auxiliary heating means, preferably far infrared radiation lamps 37 be provided in the preheating chamber 23a at a position adjacent to the inlet aperture 31a for reasons of reduction of preheating time. Designated as 38 are reflecting plates to increase the heating efficiency of the lamps 37.

Second heating means, preferably far infrared irradiation lamps 39 with reflecting plates 40 are provided in the center space 28c of the reflowing chamber 22 for causing the solder pastes 3 to melt or reflow during the passage of the printed circuit board 1 through the reflowing chamber 22. If desired, auxiliary air heaters such as sheaths heaters similar to the heaters 36a and 36b may be provided in the reflowing chamber 22 to facilitate the reflowing operation.

The above-described soldering apparatus operates as follows. First, the temperatures within the upstream end preheating chamber 23a and the the succeeding preheating chamber 23b are maintained at about 160° C. and 140° C., respectively. The printed circuit board 1 bearing chip parts 2 is first introduced through the inlet aperture 31a into the preheating chamber 23a where it is heated to about 140° C. with the heated air recirculating through the center space 28a by the operation of the fan 34a. Since the heated air in the chamber 23a is about 160° C., the heating of the board 1 to about 140° C. can be effected within a relatively short period of time.

The board 1 is then transferred through the aperture 32a to the succeeding preheating chamber 23b where it is contacted with the heated air at about 140° C. This step serves to effect a fine adjustment of the temperature of the board and to minimize the temperature fluctuation of the board 1. The preheating in the chambers 23a and 23b is generally performed for about 60-80 seconds. The preheated board 1 is then fed through the aperture 32b to the reflowing chamber 22 where it is heated with the lamps 39 quickly (generally at 215° C. for 15-20 seconds) to cause the solder pastes or preforms to melt. Thereafter, the board 1 is discharged from the reflowing chamber 22 and is introduced through the aperture 33 into the cooling chamber 24 where it is cooled by means of a cooling fan 41 to solidify the molten solder and to provide firm bonding of the parts 2 to the board 1. The resulting board 1 is withdrawn out of the housing member 20 through the outlet aperture 31b.

Thus, in the soldering apparatus according to the present invention, since one or more, preferably two, preheating chambers 23a and 23b are provided upstream of the reflowing chamber 22, heating of the board 1 can be sufficiently effected without involving thermal damages of the chip parts mounted thereon. Moreover, since the air within the preheating chambers 23a and 23b and, if desired, the reflowing chamber 22 is forcibly recirculated in each chamber and since flow control plates 35a, 35b and 35c are provided above the board transfer path, the flow of the heated air in each chamber is uniformly distributed so that the entire printed circuit board 1 can be heated uniformly.

I claim:

1. An apparatus for soldering printed circuit boards having electric parts temporarily mounted thereon with solder preforms, comprising:

an axially elongated housing member;

conveying means providing a path along which the printed circuit boards are conveyed through said housing member in the direction parallel to the axis of said housing member;

one or more transversely extending partition means provided within said housing member for partitioning the inside space thereof into axially aligned reflowing chamber and one or more preheated chambers, with said reflowing chamber being located downstream of said one or more preheating chambers with respect to the direction of the travel of said printed circuit boards through said housing member;

an aperture provided in each of said transversely extending partition means to permit the printed circuit boards to pass therethrough;

a pair of spaced apart vertical partitions extending axially within each of said preheating chambers and said reflowing chamber for partitioning same into two, outer, air flow channels and a center space;

upper and lower openings provided in each of said vertical partitions so that the air flow channels of each chamber are in fluid communication with the corresponding center space;

first heating means disposed in the center space of each of said preheating chambers and reflowing chamber for heating the air in said center space, so that the printed circuit boards are preheated with the heated air during their passage through said chamber;

second heating means disposed within said reflowing chamber for causing the solder preforms of the printed circuit boards to reflow during their passage through said reflowing chamber, said second heating means being one or more reflector type infrared radiation lamps;

fan means provided in the center space of each of said preheating chambers and reflowing chamber to cause the air in said chamber to circulate through said center space and said air flow channels; and flow control plates provided in the center space of each of said preheating chambers and reflowing chamber and positioned between the fan and the path of travel of the printed circuit boards for controlling the flow of the circulating air through said center space so as to uniformly heat the printed circuit boards.

2. An apparatus as set forth in claim 1, further comprising a cooling chamber provided adjacent to and downstream of said reflowing chamber with said path of the printed circuit boards extending through said cooling chamber, and a cooling fan provided in said cooling chamber and operable for cooling the printed circuit boards during their passage through said cooling chamber.

3. An apparatus as set forth in claim 1, wherein said first heating means includes one or more electric heaters.

4. An apparatus as set forth in claim 1, further comprising an auxiliary heater provided in the upstream end preheating chamber to expedite the heating of the printed circuit boards.

5. An apparatus as set forth in claim 4, wherein said auxiliary heater includes one or more far infrared radiation lamps.

6. An apparatus as set forth in claim 1, wherein said flow control plates are axially spaced apart plates extending laterally between and supported by said pair of vertical partitions.

* * * * *